Feb. 11, 1930.   R. S. BURDETTE   1,746,763
METHOD FOR RETREADING TIRES
Original Filed June 10, 1921
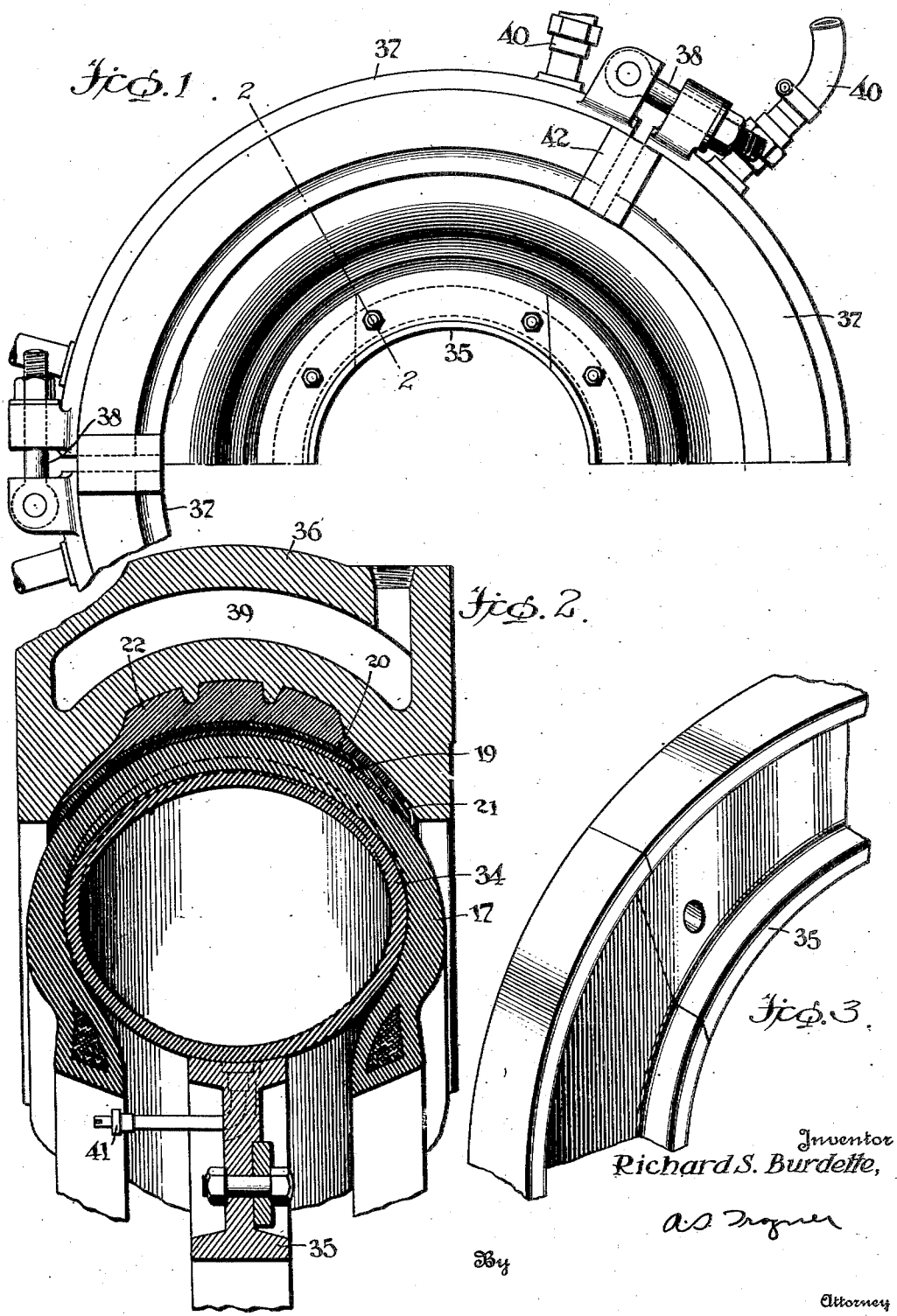
Inventor
Richard S. Burdette,
By
Attorney Patented Feb. 11, 1930

1,746,763

UNITED STATES PATENT OFFICE

RICHARD S. BURDETTE, OF AKRON, OHIO, ASSIGNOR TO THE GOODYEAR TIRE & RUBBER COMPANY, OF AKRON, OHIO, A CORPORATION OF OHIO

METHOD FOR RETREADING TIRES

Original application filed June 10, 1921, Serial No. 476,637. Divided and this application filed February 20, 1926. Serial No. 89,618.

My invention relates, broadly, to improvements in methods of applying outer covering portions of tire casings, and more specifically to an apparatus and a method for use in performing what is known as the retreading operation, i. e. replacing the tread elements or a portion thereof upon pneumatic tire casings.

In performing the retreading operation by the usual practice, after the casing has been stripped to the carcass, new tread elements, such as a cushion strip, breaker strip, under tread, and tread band, are arranged in order upon the carcass and are subsequently united therewith by the process of vulcanization. Additional elements may be included in this tread assembly, but the element to be applied directly to the carcass is always the cushion strip which is composed of rubber or rubber composition. The elements are then bound to the casing by a cloth wrapping, or frequently, the casing is enclosed in a mold, and the casing and elements are expanded or stretched against the wrapper, or the mold, in order that they may be held in a compressed condition during vulcanization. Usually an airbag, or like device, is disposed with the casing, and fluid under pressure is introduced therein to procure the expansive action. The casing is then vulcanized in an open heater with steam pressure.

The above described procedure has, in practice, been found to produce satisfactory results, given favorable conditions, but it is unreliable in its action for the following reasons. The carcass portion of a tire casing being essentially a fabric structure is, therefore, porous. Air frequently becomes entrapped between the carcass and the air bag, and is subsequently forced, by the expansion of the bag and the pressure in the heater through the carcass portion, directly against the rubber cushion strip. The cushion strip being impervious to fluid, the result is substantially the formation of an air pocket between the strip and the carcass portion, which entrapped air, in conjunction with the action of the pressure within the heater, prevents the air bag from properly compressing the casing and tread against the wrapping during vulcanization. As will be readily understood, in vulcanizing rubber and fabric together, positive and uniform compression of the materials is essential in order that a proper union may be procured. Therefore, in the above described contingency, only a partial union occurs between the cushion strip and the carcass during vulcanization. Substantially the same undesirable results, obtaining in the practice of the commonly used method, above described, occur when moisture accumulates in the various plies of the carcass.

It is the primary object of my invention to provide an apparatus for use in retreading tires whereby the previously mentioned disadvantages are obviated, or in other words, a uniform compression between the carcass, and all of the various elements of the tread may be positively effected.

The invention is further directed to procuring this advantageous objective by the use of a minimum degree of fluid pressure within the casing, a result impossible of attainment in the practice of the previously described method inasmuch as the greater force of internal pressure is expended in stretching the carcass and its associated elements up to the wrapper or mold, and also in stretching the wrapper.

Other objects and advantages, such as eliminating stretching of the casing and the air bag above referred to, will become apparent when the following detailed description is read in conjunction with the drawings accompanying and forming a part of this specification.

In the drawings:

Fig. 1 is a side elevational view illustrating one embodiment of my invention;

Fig. 2 is a transverse sectional view, on an enlarged scale, taken on the line 13—13 of Fig. 1; and Fig. 3 is a perspective view of a portion of one of the elements of the apparatus illustrated in Fig. 1.

In the accompanying drawings I have illustrated, in combination with an elastic airbag 34, the use of means for compressing the crown of a tire casing 11 and the tread elements 19, 20, 21 and 22. An annulus 35 which may be either expansible or inexpansible is provided for supporting the airbag 34 upon which the tire casing 11 is mounted. The compressing means in this instance comprises a mold 36, which, as shown, is formed of sections 37 adapted to be drawn together with their ends in juxtaposed relation by means of nut and bolt devices 38. Each section is chambered, as indicated at 39, and suitable connections 40 are provided for the admission of steam or hot water into the respective mold chambers. Preferably, I provide mold sections of approximately the width of the tread band, or in other words, of such width as to leave the side walls of the casing exposed. The mold sections are constructed of such circumferential dimensions that, when they are assembled, they may be drawn together to form a full circle mold, the circumference of which is shorter than that of the tread of the casing. With such a mold construction the tread ara of the casing and the tread elements are compressed as the mold sections are drawn together, and the side walls of the casing are flexed outwardly. The normal position of the air bag is indicated in dotted lines in Fig. 2 of the drawings, the full line showing indicating the position of the several elements when the mold sections have been drawn together.

When the casing has been compressed to substantially the full line position of Fig. 2, fluid under pressure is admitted through the valve stem 41 into the air bag 34, thus flexing the bag in the direction of the mold sections, and compressing the tread portion of the casing thereagainst. Steam or hot water is next admitted into the mold sections, and the tread elements are thus vulcanized to the casing. Molds of this character may be adjusted in accordance with the variations in size of casings, and may be made with as many sections as desired. Also shims or filler plates, such as are shown at 42, may be utilized to join the ends of the mold sections to prevent the formation of ridges in the tread, in the event that the mold in the drawn together position of its section is too small for the size of casing being retreaded.

It will be noted that stretching of the casing and its associated elements, as well as the air bag, is obviated, and that the compression of the elements to be united is secured entirely through a flexing action that does not distend the casing beyond its normal cross-sectional and circumferential dimensions.

This application is a division of my application Serial No. 476,637, filed June 10, 1921, which has since issued as Patent No. 1,579,641, dated April 6, 1926. Although I have shown a preferred form of my invention and utilized specific language in describing the practice thereof, it is to be understood that such disclosure is merely illustrative, and is not to be considered in any way restrictive of the scope and spirit of the invention unless otherwise indicated in the claim appended hereto.

What I claim is:

A method of retreading pneumatic tire carcasses which comprises applying a tread element to the outer periphery of the carcass, disposing the carcass in rigid segmental molds having smaller internal peripheries than the external periphery of the carcass, drawing the segments of the mold together to restrict the circumference of the carcass, applying pressure within the carcass to expand the latter against the inner periphery of the mold, and subjecting the tread element to vulcanization.

In witness whereof, I have hereunto signed my name.

RICHARD S. BURDETTE.